United States Patent [19]

Nyman et al.

[11] 4,360,254
[45] Nov. 23, 1982

[54] CAMERA HAVING STEPPER MOTOR DRIVEN FILM TRANSPORT/REGISTRATION SPROCKET

[75] Inventors: Bengt E. Nyman, Tempe, Ariz.; Jerry H. Lehmann, Rochester, N.Y.

[73] Assignee: Mangum-Sickles Industries, Inc., Tempe, Ariz.

[21] Appl. No.: 134,565

[22] Filed: Mar. 27, 1980
(Under 37 CFR 1.47)

[51] Int. Cl.³ .............................................. G03B 1/00
[52] U.S. Cl. ................................... 352/166; 332/180; 332/187; 332/121
[58] Field of Search ............... 352/180, 187, 166, 208, 352/195, 225, 44, 46, 51, 85, 133, 136, 37, 89, 87, 90, 121, 200; 354/110

[56] References Cited

U.S. PATENT DOCUMENTS

| | | | |
|---|---|---|---|
| 3,632,194 | 1/1972 | Myles | 352/200 |
| 3,819,258 | 6/1974 | Butler et al. | 352/187 |
| 3,912,383 | 10/1975 | Stutz | 352/166 |
| 3,914,035 | 10/1975 | Satterfield | 352/225 |
| 4,022,525 | 5/1977 | Boudouris | 352/180 |
| 4,149,781 | 4/1979 | Everett | 352/180 |
| 4,150,886 | 4/1979 | Merkel et al. | 352/180 |

FOREIGN PATENT DOCUMENTS

| | | | |
|---|---|---|---|
| 2333021 | 1/1975 | Fed. Rep. of Germany | 352/187 |
| 261211 | 12/1928 | Italy | 352/180 |

Primary Examiner—Monroe H. Hayes
Attorney, Agent, or Firm—Cahill, Sutton & Thomas

[57] ABSTRACT

A camera for taking a plurality of exposures upon a continuous length of film includes a film transport/registration sprocket mounted directly to the shaft of a first stepper motor for incremental rotation thereby. The film transport/registration sprocket engages sprocket holes along the edges of the film for transporting the film through the camera and registering the film relative to an aperture plate assembly. Guide rollers are provided to guide a portion of the film past the aperture plate assembly through which the film can be exposed. The aperture plate assembly includes an aperture frame which supports a removable aperture mask for selecting the area of film to be exposed. A shutter disk is mounted to a shaft for rotation by a second stepper motor in order to expose the film. A pressure plate controlled by the shutter disk shaft urges the film against registration pins within the aperture frame which engage the sprocket holes in the film during each exposure. A movable mirror directs the image to be photographed onto a ground glass reticle to permit viewing of the image prior to exposure of the film. A guide system allows for the insertion of a film strip immediately behind the ground glass reticle for viewing the image to be photographed superposed with an image recorded on the film strip.

1 Claim, 15 Drawing Figures

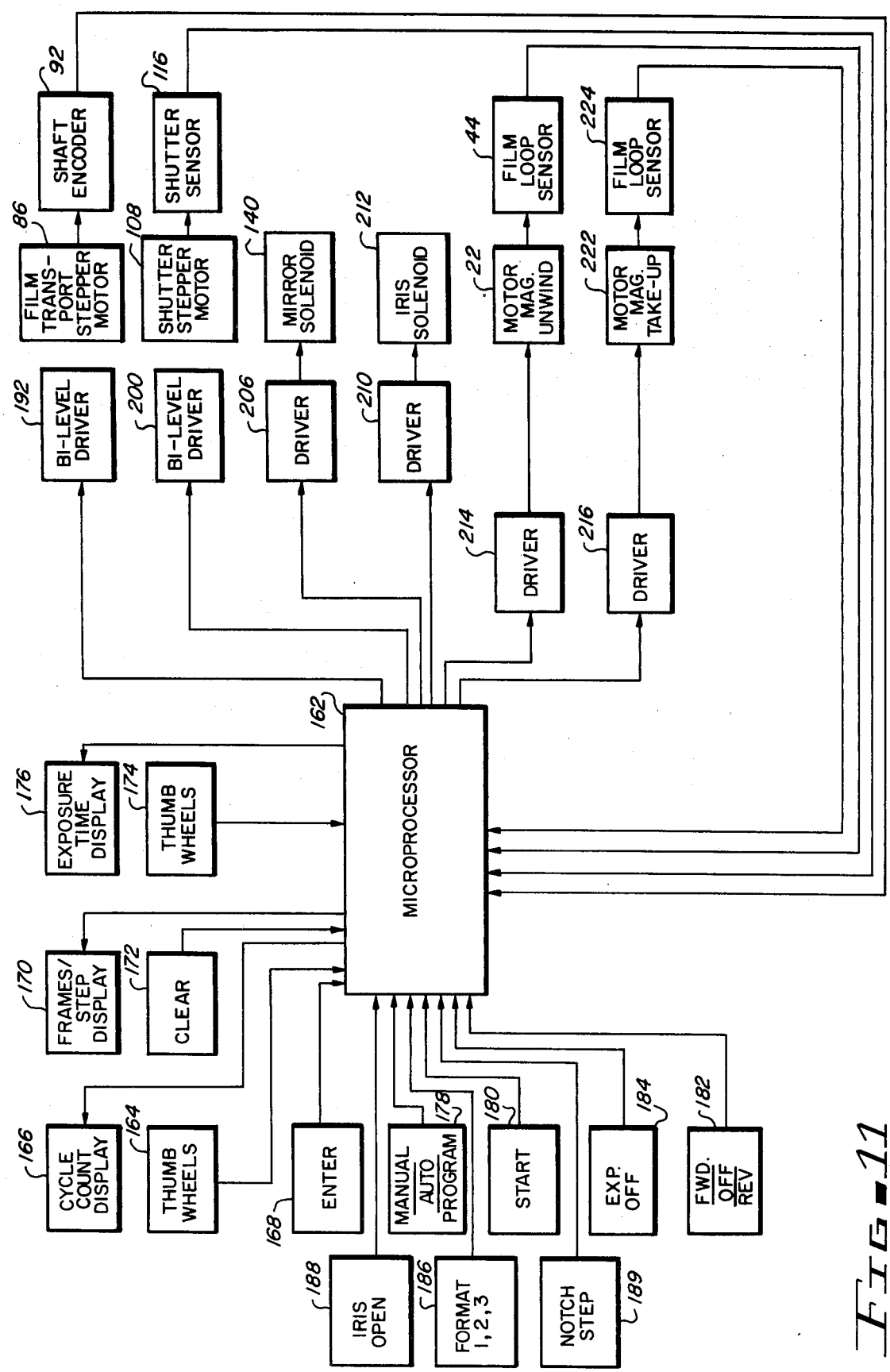

CAMERA HAVING STEPPER MOTOR DRIVEN FILM TRANSPORT/REGISTRATION SPROCKET

BACKGROUND OF THE INVENTION

1. Field of the Invention

The present invention relates generally to cameras for taking a plurality of exposures on a continuous length of film and, more particularly, to a camera used primarily in slide production, slide reproduction, slide animation, and movie animation applications.

2. Description of the Prior Art

Generally speaking, movie cameras are designed to expose film at a fixed rate, i.e., a fixed number of frames of film are exposed each second. Such cameras typically expose film at the rate of 16, 24, or even as high as 64 frames per second. Variations in the illumination of the subject being photographed are compensated solely by adjusting the iris or aperture of the lens since the time during which each frame is exposed is a constant. As a result of the fixed exposure time per frame and the resulting fixed number of frames exposed per unit time, cameras of this type have film transport mechanisms which run continuously at a constant speed.

In addition to the film transport mechanism, a registration mechanism is generally provided for registering successive portions or frames of film in proper position for exposure. The registered frame of film is temporarily held stationary while it is being exposed. The registration mechanism is typically a sprocket or claw which engages sprocket holes along the edges of the film. The registration sprocket or claw has a periodic intermittent motion for periodically advancing the film for exposing successive frames. The periodic intermittent motion of the registration sprocket or claw may be achieved by providing a motor which rotates at a constant speed and coupling the motor to the sprocket or claw via a Geneva movement or the like.

Movie cameras of the type described above are also designed to expose a fixed area of film per exposure. Thus, the length of film advanced by the registration mechanism prior to each exposure is also fixed.

In contrast to the cameras of the type mentioned above, cameras of the type designed for commercial slide production, slide reproduction, slide animation, and movie animation must allow for variable exposure times and varying film frame sizes. In cameras of this second type, it is necessary that the time period for exposing each frame of film be widely adjustable as exposure times typically range from 0.04 seconds to 100 seconds per exposure. Clearly, the rate at which film can be transported through the camera is directly dependent upon the selected exposure time. Nonetheless, in applications such as slide reproduction, it is not uncommon for the camera to take hundreds or even thousands of successive exposures of the same subject. Therefore, the speed at which the camera can transport film is a critical factor. Since the overall film transport speed varies according to the selected exposure time, a constant speed film transport and registration mechanism of the type used within the above described movie cameras is not compatible with a camera used for commercial slide production, etc. Instead, the film transport and registration mechanism must exhibit a start/stop motion, starting when an exposure has been completed and the film is to be advanced to the next frame, and stopping immediately prior to the next exposure.

As a result of the required start/stop motion, the inertia of the film transport/registration system places a limitation on the film advance speeds attainable by the camera. As the inertia associated with the film transport and registration mechanisms is increased, the time required to advance the film to the next frame is also increased. If a Geneva movement or similar intermittent motion mechanism is used to achieve film registration, then the inertia associated with the Geneva star wheel or similar device must be overcome by the motor which drives the registration mechanism. In addition to the inertia of the Geneva mechanism, the inertia of the motor itself also limits the rate at which the film can be accelerated and decelerated unless a brake-clutch assembly is provided for allowing the motor to run continuously.

Cameras of the type used for commercial slide production and animation typically include a film supply magazine having a reel for storing film to be exposed by the camera and also include a film take-up magazine having a reel for storing film after it has been exposed by the camera. Typically, motors are provided for driving the reels within the film supply and film take-up magazines. Since the rate at which film is transported through the camera is exposure time dependent, these reel driving motors must be synchronized with the film transport and registration mechanisms of the camera. It is particularly important that the inertia associated with the film supply reel and its associated driving motor be prevented from limiting the acceleration and speed of the film transport and film registration mechanisms. Thus, the motor which drives the film supply reel must, in a timely manner, unwind a length of film which is equal to the length of film advanced by the film transport and registration mechanisms.

Precise film registration is very important for cameras of the type used for commercial slide production and movie animation. In such applications, it is not uncommon for a single frame of film to be exposed more than once. In some applications, each frame of film may be exposed from ten to twenty times. In such applications, a first subject, such as a cartoon character, may be photographed repeatedly on successive frames of film. Following this initial step, the film may be reversed back to the initial frame and a second subject, such as a background, will again be repeatedly photographed on the same frames which were initially used to record the image of the cartoon character in order to superpose the two images. In such applications, it is absolutely essential that each frame of film be positioned in exactly the same place during the second and subsequent exposures as it was during the first exposure.

In cameras of the type used for commercial slide production and animation, it is desirable to be able to use the camera with a plurality of different film format (e.g., 16 mm., 35 mm., and 46 mm. film). In order for the camera to be used with a plurality of different film formats, it is necessary to increase or decrease the length of film per frame advanced by the film transport and registration mechanisms in accordance with the film format selected. To provide such a feature, prior art cameras of this type which employ Geneva movements or similar mechanisms to achieve film registration would have necessarily required several gears of various ratios and a means for selecting one of the several gears in order to vary the distance by which the film is advanced.

Accordingly, one object of the present invention is to provide a camera for taking a plurality of exposures upon a continuous length of film, the camera allowing widely varying exposure time while advancing the film from one frame to the next at a relatively high rate of speed.

It is another object of the present invention to provide such a camera including a film transport and registration mechanism having relatively little inertia associated therewith for allowing rapid acceleration, transport, and subsequent deceleration of the film between successive exposures.

Still another object of the present invention is to provide such a camera for rapidly accelerating, transporting, and decelerating the film between exposures while attaining a high degree of accuracy in registration of the film for allowing multiple exposures of the same frame of film.

Yet another object of the present invention is to provide such a camera which provides for adjustment of the length of film to be advanced between exposures without further complicating the film transport and film registration mechanisms and without increasing the inertia associated with such mechanisms.

SUMMARY OF THE INVENTION

Briefly described, and in accordance with one embodiment thereof, the present invention relates to a camera for taking a plurality of exposures upon a continuous length of film, the camera including a film transport/registration sprocket for engaging sprocket holes within the film, the sprocket being incrementally rotated by a stepping motor for transporting film through the camera and for controlling the position of the film within the camera. Film transported by the sprocket is guided past an aperture plate assembly where the film can be positioned for exposure. Inertia associated with a film supply reel is decoupled from the sprocket by the provision of a film supply motor for unwinding the film from the film supply reel. A roller mechanism which engages the the unwound film, and a magnetic field sensor acting in conjunction with the roller mechanism control actuation of the film supply motor. A tight-loop film transport arrangement is maintained wherein the sprocket engages the film both before and after the film is guided past the aperture plate assembly, the sprocket acting not only to transport film through the camera but also to position the film relative to the aperture plate assembly.

BRIEF DESCRIPTION OF THE DRAWINGS

FIG. 11 is a block diagram of control circuitry which controls the operation of the camera.

DETAILED DESCRIPTION OF THE PREFERRED EMBODIMENT

Figure 1:
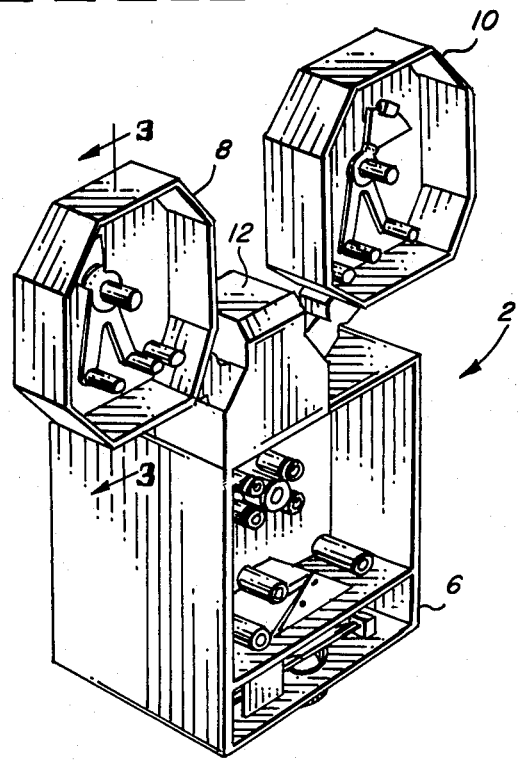
FIG. 1 is a perspective view of a camera having its front portions removed to show the arrangement of its internal components.

FIG. 1 illustrates a camera generally designated 2 which includes a film transport housing 4, a lens and shutter housing 6, a removable film supply magazine 8, a removable film take-up magazine 10 and a magazine support housing 12. Film transport housing 4 is covered by a lightproof cover attached to the front portion of housing 4 during actual operation of camera 2. The front portion of lens and shutter housing 6 is also normally covered by a ground glass reticle and a film strip guide mechanism to be described below. Similarly, film magazines 8 and 10 have lightproof covers attached to their front portions during actual operation of camera 2.

Regarding film magazines 8 and 10, the terms "film supply" and "film take-up" are used herein merely to distinguish film magazines 8 and 10 from each other and to simplify the description of the camera. Camera 2 is designed to transport film in both forward and reverse directions, and the roles of film magazines 8 and 10 may be interchanged depending upon the selected film transport direction.

Camera 2 is typically supported by a stand (not shown) and positioned above a working table upon which the object to be photographed is to be arranged. Camera 2 also includes a control panel (not shown) containing switches for selecting a desired mode of operation via control circuitry to be described below.

Figure 3:
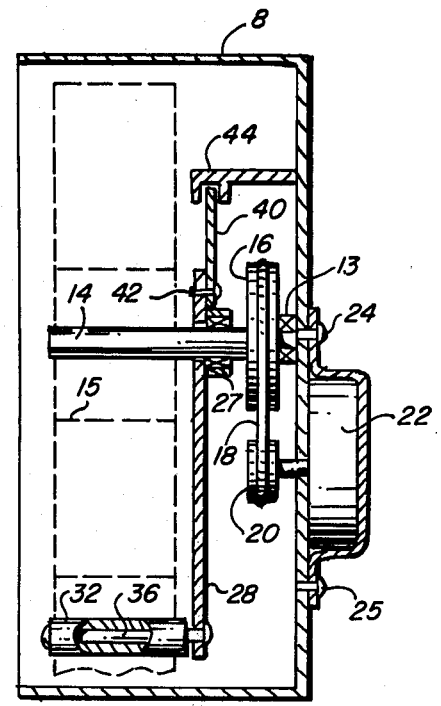
FIG. 3 is a cross-sectional view taken along lines 3—3 as shown in FIG. 2.
Figure 2:
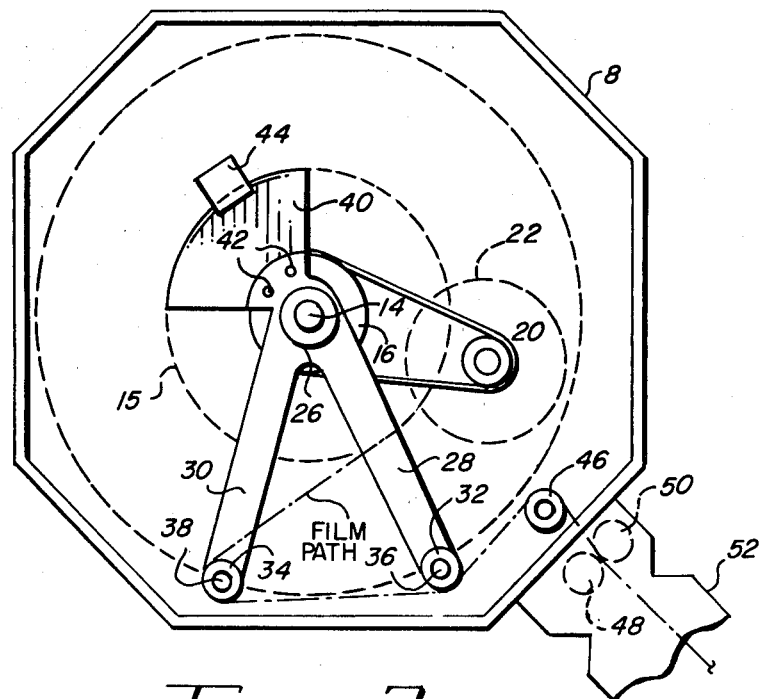
FIG. 2 is a frontal view of a film supply magazine included within the camera shown in FIG. 1.

Referring now to FIGS. 2 and 3, film supply magazine 8 includes a bearing hub 13 which rotatably supports a drive spindle 14 for engaging a removable film supply reel 15 (shown by dashed lines in FIGS. 2 and 3). Spindle 14 is secured to a pulley 16 over which drive belt 18 is passed. Drive belt 18 is also passed over a second pulley 20 which is secured to the shaft of a relatively flat D.C. motor 22 of the type referred to in the industry as a "pancake motor". Motor 22 may be of the type supplied by PMI Corporation of Syosset, New York, under Model No. U-9-F. Pulley 16 is relatively larger in diameter than pulley 20 in order to increase the torque applied to the film supply reel 15 by motor 22. Motor 22 is secured to film supply magazine 8 by screws 24 and 25 whereby film supply magazine 8 and motor 22 form a single unit. Thus, only the electrical wiring between film supply magazine 8 and other portions of camera 2 need be disconnected in order to remove film supply magazine 8 from the camera.

Film supply magazine 8 also includes a dancer roller assembly designated 26 which freely rotates about spindle 14 by way of bearings 27. Dancer roller 26 has first and second lower arms 28 and 30 which include first and second rollers 32 and 34 rotatably mounted upon pins 36 and 38, respectively. A thin flag 40 made of a ferrous metal is attached to the upper portion of dancer roller 26 by screws 42. A U-shaped sensor 44 is secured to film supply magazine 8 in a manner which allows metallic flag 40 to pass within the U-shaped portion of sensor 44. Sensor 44 is responsive to the magnetic field within its U-shaped portion, and the passage of metallic flag 40 through the U-shaped portion of sensor 44 can be detected by a change in the magnetic field therein. Magnetic sensor 44 may be of the type supplied by Microswitch Corporation under Model No. 1AV3A.

When film supply reel 15 is removed from spindle 14, the weight of arms 28 and 30 causes dancer roller 26 to hang substantially as shown in FIG. 2. In this instance, metallic flag 40 is within the U-shaped portion of magnetic sensor 44. When film supply reel 15 is installed on spindle 14, film unwound from film supply reel 15 is threaded under rollers 34 and 32 to form a film supply loop as indicated by the dotted line film path shown in FIG. 2. The film is then passed over a fixed guide roller 46 and threaded between guide rollers 48 and 50 within an extension 52 of magazine support housing 12. Assuming initially that motor 22 is off and that film supply reel 15 is stationary, it will be seen that as film is drawn into film transport housing 4, the length of film within the film loop formed around the dancer roller 26 will be decreased, causing dancer roller 26 to rotate counter-clockwise. When dancer roller 26 has been thus rotated approximately 45°, metallic flag 40 will leave the U-shaped portion of magnetic sensor 44. Control circuitry (to be described below) responsive to magnetic sensor 44 actuates motor 22 to rotate film supply reel 15 clockwise in order to unwind additional film therefrom. Dancer roller 26 then rotates clockwise under the force of gravity to take up the slack in the unwound film. As dancer roller 26 rotates clockwise, metallic flag 40 re-enters magnetic sensor 44, and the control circuitry deactuates motor 22 to prevent an excess amount of film from being unwound. The cycle described immediately above is continuously repeated as film is transported through camera 2. It should be noted that film take-up magazine 10 includes components identical to those described for film supply magazine 8 which allows film take-up magazine 10 to operate in a similar manner when the film transport direction is reversed.

Figure 4:
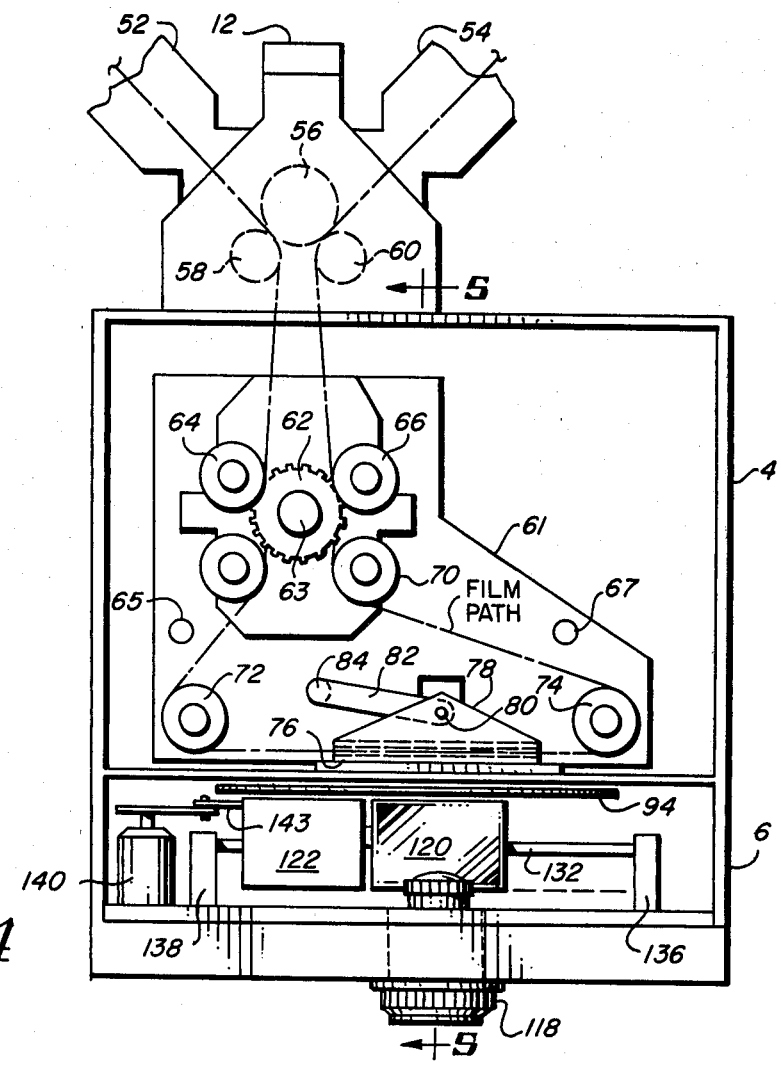
FIG. 4 is a frontal view of a portion of the camera shown in FIG. 1.
Figure 6:
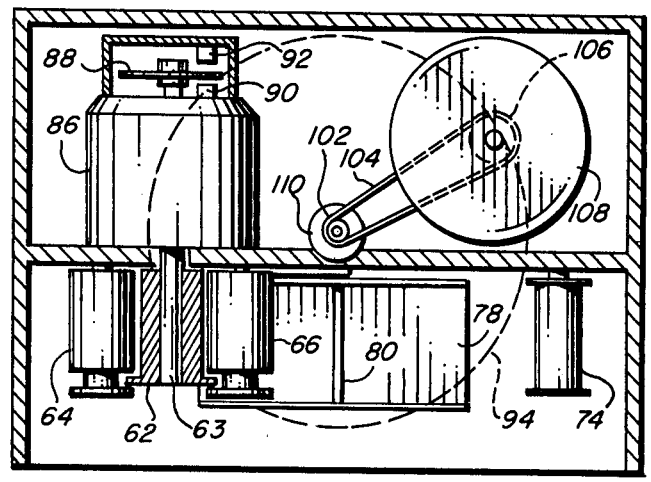
FIG. 6 is a cross-sectional top view taken through lines 6—6 as shown in FIG. 5.
Figure 5:
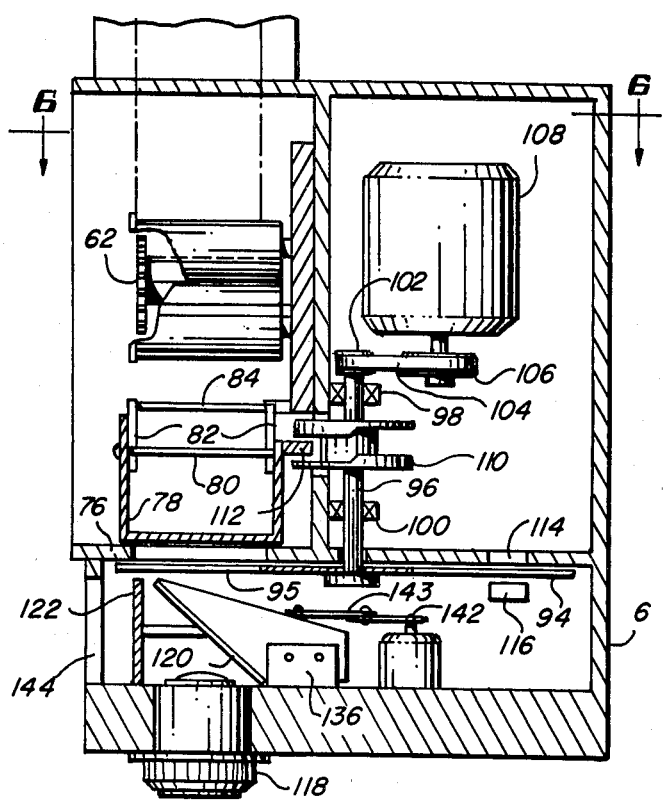
FIG. 5 is a cross-sectional side view taken through lines 5—5 as shown in FIG. 4.

Referring now to FIGS. 4, 5 and 6, magazine support housing 12 includes extensions 52 and 54 for supporting film supply magazine 8 and film take-up magazine 10, respectively. Magazine support housing 12 includes guide rollers 56, 58 and 60 for guiding film from extension 52 into film transport housing 4 and guiding film from film transport housing 4 into extension 54 as indicated by the dotted line film path shown in FIG. 4.

An interchangeable film transport module designated generally 61 includes a film transport/registration sprocket 62 removably secured to a rotatable shaft 63 within film transport housing 4. Quick mount screws 65 and 67 removably secure film transport module 61 to film transport housing 4. Various film transport modules having a transport sprocket and rollers of various lengths can be used to adapt the camera to various film formats. The raised teeth portions of sprocket 62 engage film sprocket holes regularly spaced along the edges of the film for maintaining a positive driving relationship between sprocket 62 and the film transported thereby. When film is being transported in the forward direction, sprocket 62 is rotated in a counter-clockwise direction (see FIG. 4). However, the film transport direction can be reversed merely by rotating sprocket 62 in a clockwise direction.

As shown in FIG. 4, film transport module 61 also includes two keeper rollers 64 and 66 which are selectively positioned adjacent sprocket 62. Keeper rollers 64 and 66 have radial grooves opposite the teeth of sprocket 62 for keeping the sprocket holes of the film engaged with the teeth of sprocket 62. The axles of keeper rollers 64 and 66 may be displaced away from sprocket 62 when film is initially being threaded through the camera.

The loop of film extending below sprocket 62 is passed over guide rollers 68, 70, 72 and 74 which are also mounted to film transport module 61. The portion of the film lying between rollers 72 and 74 extends over an aperture plate assembly 76, also mounted to film transport module 61, through which the film can be exposed. During such exposures, a pressure plate 78 is moved downwardly to urge the film against aperture plate assembly 76. In order to properly align a frame of film with the aperture plate assembly, registration pins are provided within aperture plate assembly 76 for engaging sprocket holes along the edges of the film whenever pressure plate 78 presses the film against aperture plate assembly 76. Pressure plate 78 is pivotally connected by pin 80 to one end of support arms 82, the other ends of which are pivotally mounted to film transport module 61 by a pin 84. The mechanism by which pressure plate 78 is raised and lowered will be described below.

The film transport/registration mechanism described above is typically referred to as a tight-loop film transport arrangement as there is no slack within the loop of film formed between sprocket 62 and guide rollers 68, 70, 72 and 74. Were the camera to include a separate claw or registration sprocket in addition to sprocket 62 in order to register the film with aperture plate assembly 76, the film transport loop would necessarily include some slack to account for the intermittent motion of the claw or registration sprocket relative to the film transport sprocket. Therefore, sprocket 62 serves the dual purpose of transporting the film through the camera as well as registering the film relative to aperture plate assembly 76 prior to each exposure.

As shown best in FIG. 6, shaft 63 upon which sprocket 62 is mounted is coincident with the drive shaft of a stepping motor 86. Stepping motor 86 may be of the type supplied by Rapidsyn Company, Sante Fe Springs, California, under Model No. 34D9109. Because stepping motors develop relatively high torque, they can be accelerated and decelerated at high rates of speed. As the principals of operation of stepping motors are well known in the art, the operation of stepping motor 86 will be only briefly described. Stepping motor 86 includes a plurality of field coils which can be energized to rotate the rotor of stepping motor 86 by a predetermined angle in either direction. In particular, stepping motor 86 is designed to rotate through an angle of 1.8 degrees per actuation of its field coils. Thus, two hundred successive actuations of the field coils of stepping motor 86 will result in stepping motor 86 making one complete rotation through 360 degrees.

The combination of a single film transport/registration sprocket for transporting film in a tight-loop configuration in conjunction with a stepping motor which directly drives the film transport/registration sprocket allows the film to be accelerated and decelerated at a high rate of speed. The elimination of a separate claw or registration sprocket in order to achieve film registration significantly reduces the number of moving parts whose motion must be started and stopped for each advancement of the film. Similarly, the incremental rotation of stepping motor 86 eliminates the need for Geneva mechanisms or other intermittent motion type couplings between a drive motor and the means for registering the film. The significant reduction in the number of moving parts results in a corresponding reduction in the intertia associated with the film transport/registration mechanisms.

The above described operation of dancer roller 26 within film supply magazine 8 substantially decouples the inertia of the film supply reel from sprocket 62, thereby further reducing the inertia which must be overcome by stepping motor 86. In addition, the high degree of accuracy over the angular position of the shaft of stepping motor 86 substantially guarantees the proper positioning of the film in relation to aperture plate assembly 76.

Another advantage provided by stepping motor 86 is that the length of film advanced between exposures (the distance between frames) can easily be varied by simply controlling the number of successive actuations of stepping motor 86 between exposures. In the preferred embodiment of the present invention, stepping motor 86 is actuated either 25, 50, or 100 times between exposures in order to rotate sprocket 62 either 45 degrees, 90 degrees, or 180 degrees, respectively, between exposures.

Referring again to FIG. 6, the rear portion of the shaft of stepping motor 86 has a glass disk 88 mounted thereto. A thin layer of metal is patterned on the glass disk whereby eight transparent portions are spaced equiangularly (45 degrees apart) around the disk. A light source 90 is positioned on one side of glass disk 88 while a light sensor 92 is positioned opposite light source 90. As stepping motor 86 is rotated, light from source 90 is alternatively blocked by the metal deposited on glass disk 88 or allowed to pass through the transparent portions of glass disk 88 and reach sensor 92. Thus glass disk 88, light source 90, and sensor 92 cooperate to encode the position of the shaft of stepping motor 86. Control circuitry (to be described below) which controls the operation of the camera is responsive to sensor 92 for verifying that stepping motor 86 has been accurately rotated prior to allowing a subsequent exposure.

Figure 14:
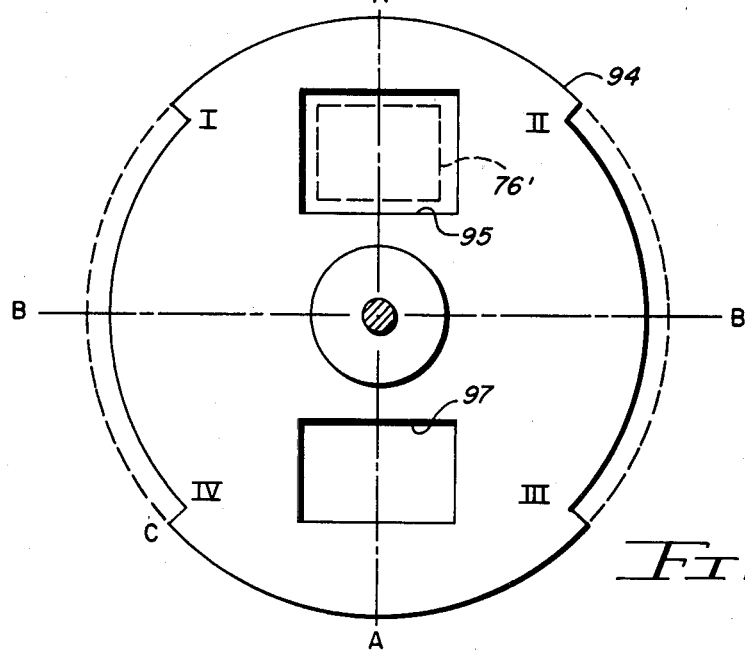
FIG. 14 is a top view of a shutter disk illustrating a position encoding feature.

Also shown in FIGS. 4–6 and, more particularly in FIG. 14, is a shutter disk 94 within lens and shutter housing 6. In FIG. 6, the perimeter of shutter disk 94 is indicated by dashed lines. As shown best in FIGS. 5 and 14, portions of shutter disk 94 have been cut out to form two apertures 95 and 97 disposed opposite each other within shutter disk 94. Shutter disk 94 is mounted to a rotatable shaft 96 which is rotatably supported by bushings 98 and 100. Attached to the upper portion of shaft 96 is a pulley 102 over which a drive belt 104 is passed. Drive belt 104 also passes over pulley 106 which is attached to the shaft of a second stepping motor 108. Stepping motor 108 may be of the same type as stepping motor 86 described above.

By successively actuating the field coils of stepping motor 108, shutter disk 94 can be incrementally rotated until aperture 95 or aperture 97 is in alignment with aperture plate assembly 76 in order to expose the film. After the predetermined exposure time has passed, stepping motor 108 can again be successively actuated to rotate shutter disk 94 until aperture 95 (or aperture 97) has been repositioned out of alignment with aperture plate assembly 76 in order to terminate the exposure cycle. The rotation of shutter disk 94 following the termination of the exposure cycle may be either in the same rotational direction as was used initially to bring aperture 95 into alignment with aperture plate 76 or in the reverse direction.

During each exposure, the film to be exposed must engage the registration pins within aperture plate assembly 76 to ensure precise frame registration. As mentioned above, pressure plate 78 urges the film toward aperture plate assembly 76 during each exposure cycle. In order to synchronize the operation of pressure plate 78 with shutter disk 94, shaft 96 incorporates a cammed surface or track 110 which rotates therewith. Pressure plate 78 includes a track following member 112 which projects into track 110 for controlling the height of pressure plate 78. As shutter disk 94 rotates aperture 95 (or aperture 97) into alignment with aperture plate assembly 76, track 110 causes pressure plate 78 to pressure the film against aperture plate assembly 76. At the termination of the exposure cycle, aperture 95 (or aperture 97) is rotated away from aperture plate assembly 76 and pressure plate 78 is simultaneously lifted away from aperture plate assembly 76 to permit disengagement of the film sprocket holes from the registration pins and to permit subsequent advancement of the film. Pressure plate 78 includes stripper fingers (not shown) positioned underneath the film, the stripper fingers serving to lift the film and to positively disengage the film from the registration pins at the end of each exposure cycle.

Referring to FIG. 14, shutter disk 94 is shown positioned for aligning aperture 95 with a rectangular aperture 76' within aperture plate assembly 76. Shutter disk 94 has four rest or home positions relative to aperture 76'. The first home position, shown in FIG. 14, corresponds to aperture 95 being aligned with aperture 76'. A second home position corresponds to shutter disk 94 being rotated clockwise by 90 degrees from its first home position. A third home position corresponds to aperture 97 being aligned with aperture 76'. A fourth home position corresponds to shutter disk 94 being rotated by 90 degrees clockwise from its third home position.

In order to verify that shutter disk 94 has been properly rotated to a home position by stepping motor 108, a shutter disk position encoder is provided. As shown in FIG. 14, the diameter of the outer perimeter of shutter disk 94 varies at 90 degree intervals. The diameter as measured along dashed line A—A is approximately 0.120 inches larger than the diameter as measured along dashed line B—B. The diameter of shutter disk 94 changes at points designated I, II, III and IV in FIG. 14. A light source 114 and light sensor 116, to be described below, are positioned at a fixed location designated C in FIG. 14 for detecting the change in diameter of shutter disk 94 at points I, II, III, and IV. When either point I, II, III, or IV is adjacent to location C, shutter disc 94 is at one of its home positions.

Referring now to FIG. 5, light source 114 is positioned above shutter disk 94 adjacent its outer perimeter. Light sensor 116 is positioned below shutter disk 94 opposite light source 114. The amount of light received by light sensor 116 will change rather abruptly when either of points I, II, III, or IV of shutter disk 94 are rotated adjacent light source 114 and light sensor 116. Control circuitry (to be described below), is responsive to sensor 116 for verifying that shutter disk 94 has been properly rotated to its next home position prior to allowing further operations.

In addition to shutter disk 94, lens and shutter housing 6 includes a lens assembly 118 for focusing light received from the object to be photographed and providing an image within a focal plane. Lens 118 includes an iris adjustment for selecting the effective aperture of lens 118. The mechanism for adjusting the iris of lens 118 may be actuated by a solenoid (not shown) as is well known in the art. When the solenoid is actuated, lens 118 is in a wide open condition for transmitting a maximum amount of light. When the iris solenoid is not actuated, the iris adjustment mechanism is positioned for stopping-down lens 118 to the pre-selected iris setting.

Figure 7:
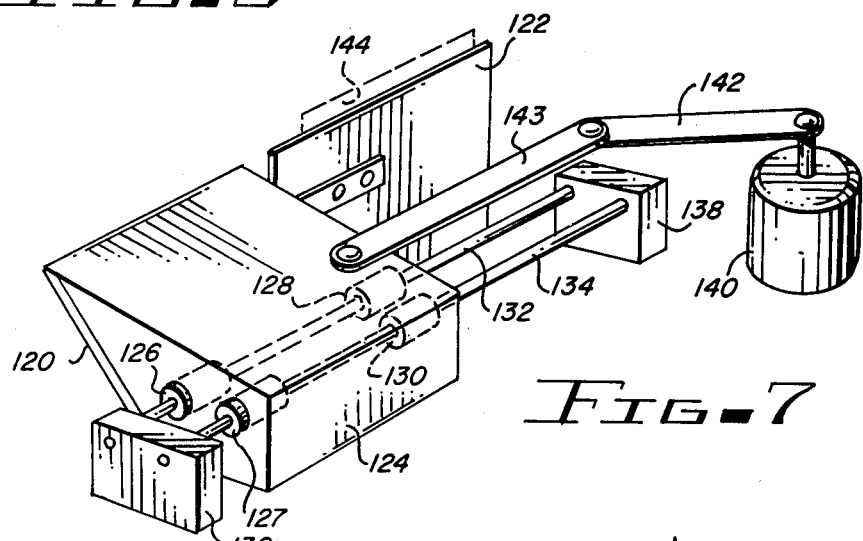
FIG. 7 is a perspective view of a movable mirror and shield plate mechanism slidably mounted to a guide track.
Figure 8A:
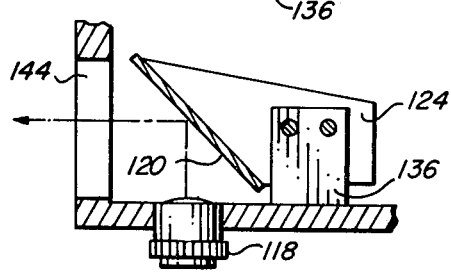
FIG. 8A is a cross-sectional view of the camera having the movable mirror positioned to reflect an image onto a ground glass reticle.

Shutter and lens housing 6 also includes a movable mirror and shield assembly to permit viewing of the image to be photographed prior to exposure of the film. Referring to FIGS. 4, 5 and 7, the movable mirror assembly includes a mirror 120 and a shield plate 122 connected to each other and suspended by a shuttle 124. Shuttle 124 includes four bushings 126, 127, 128 and 130, respectively, which slidingly engage cylindrical tracks 132 and 134. Cylindrical tracks 132 and 134 are supported at each of their ends by support members 136 and 138. A spring biased rotary solenoid 140 rotates an arm 142 which is pivotally attached to one end of link 143. The opposite end of link 143 is pivotally attached to shuttle 124 for moving shuttle 124 back and forth along guide tracks 132 and 134. Between exposures of the film, solenoid 140 is not energized, and the movable mirror assembly is biased toward support member 138. In this position, mirror 120 is positioned directly above lens 118 for reflecting light from lens 118 onto a ground glass reticle 144 positioned at the front of shutter and lens housing 6, as shown in FIG. 8A. When thus positioned, the focal plane of lens 118 is coincident with ground glass reticle 144. Thus, an observer positioned in front of the camera may view the image to be photographed as displayed by ground glass reticle 144.

Figure 8B:
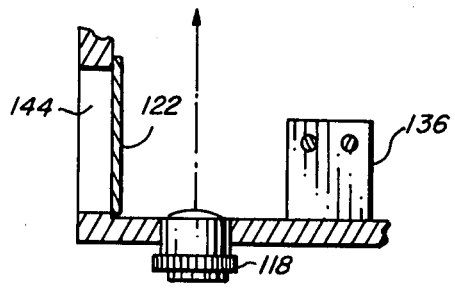
FIG. 8B is a cross-sectional side view of the camera with the shield plate positioned adjacent the ground glass reticle during an exposure of the film.

During an exposure cycle, solenoid 140 is actuated by control circuitry for forcing the movable mirror assembly toward support member 136. In this position, mirror 120 is moved away from lens 118 for allowing light to pass from lens 118, through aperture 95 within shutter disk 94, and onto the film positioned at aperture plate assembly 76. In this case, the focal plane formed by lens 118 is coincident with the film supported upon aperture plate assembly 76. Thus, the image photographed upon the film is the same as that formed upon ground glass reticle 144. As mirror 120 is moved away from lens 118, shield plate 122 is simultaneously positioned across ground glass reticle 144 to prevent light from entering the camera through ground glass reticle 144 and reaching the film during an exposure cycle, as shown in FIG. 8B.

Figure 9:
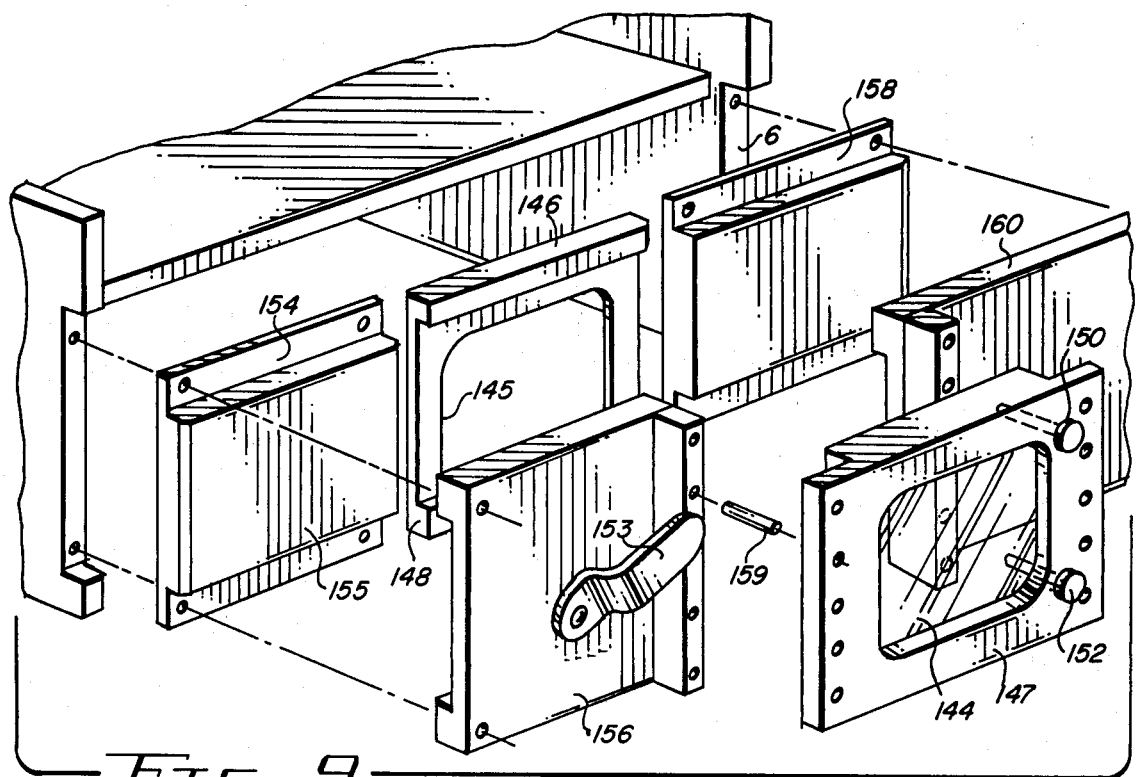
FIG. 9 is an exploded perspective view of a guide system for positioning a strip of film behind a ground glass reticle.
Figure 10:
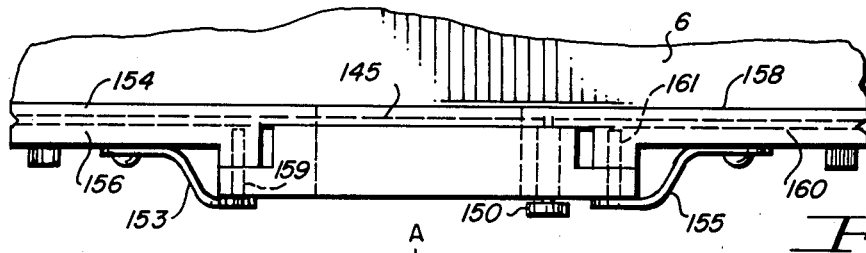
FIG. 10 is a top view of the guide system illustrated in FIG. 9.

FIGS. 9 and 10 illustrate the attachment of a ground glass reticle frame 147 containing ground glass reticle 144 to the front of shutter and lens housing 6 in a manner which allows a strip of film containing a previously photographed image to be inserted adjacent the inner surface of ground glass reticle 144. A guide member or reticle mask guide 145 is attached to lens and shutter housing 6 immediately behind ground glass reticle 144. In order to properly register the film strip guided by reticle mask guide 145 with respect to ground glass reticle 144, retractable registration pins 150 and 152 housed within reticle frame 147 are advanced through sprocket holes within the strip of film.

Reticle mask guide 145 includes a relatively thin central portion of a width approximately equal to the width of the strip of film to be inserted. A generally rectangular aperture is formed within the central portion of reticle mask guide 145 for allowing light reflected by mirror 120 to reach ground glass reticle 144.

Reticle mask guide 145 also includes an upper portion 146 and a lower portion 148 which project outwardly past the central portion of reticle mask 145 toward the ground glass reticle 144. Upper portion 146 and lower portion 148 each project sufficiently forward of the central portion of reticle mask guide 145 to allow the strip of film to pass between reticle mask guide 145 and ground glass reticle 144 while maintaining the strip of film closely adjacent to the inner surface of ground glass reticle 144. The lower edge of the inserted film strip rests upon the upper surface of lower portion 148, whereby the inserted film strip is positioned at the proper height and angular orientation relative to the ground glass reticle.

In order to guide the strip of film between reticle mask 145 and ground glass reticle 144, guide channels are formed on the left and right sides of reticle mask guide 145. The left guide channel includes a retaining member 154 having a forward projecting central portion 155. A cooperating left support plate 156 having a U-shaped cross-section is attached adjacent to and in front of retaining member 154 whereby central portion 155 extends into the U of support plate 156. Retaining member 154 and support plate 156 thereby provide a channel for guiding a strip of film between reticle mask guide 145 and ground glass reticle 144. The edges of retaining member 154 and support plate 156 oposite reticle mask guide 145 are chamfered to simplify insertion of the film strip. Similarly, a right retaining member 158 and a right support plate 160 are attached abutting the opposite side of reticle mask guide 145 for guiding the inserted strip of film. As shown in FIGS. 9 and 10, the guide channels formed by member 154 and plate 156 and by member 158 and plate 160 are each accessible at their outermost ends in order to allow the strip of film to be inserted from either side of the camera and for allowing a strip of film to be passed into the camera from one side and be passed out of the camera from the opposite side.

Reticle frame 147 is attached to the camera by way of retainer clips 153 and 155 pivotally secured to left and right support plates 156 and 160, respectively. In order to properly align reticle frame 147 (hence ground glass reticle 144) with respect to the camera generally, alignment pins 159 and 161 are inserted through holes within reticle frame 147 and into corresponding holes within support plates 156 and 160, respectively. The use of retainer clips 153 and 155 in conjunction with alignment pins 159 and 161 allows a user to quickly interchange different ground glass reticles while serving to positively locate the inserted ground glass reticle.

By inserting a strip of film between reticle mask guide 145 and ground glass reticle 144, the image to be photographed may be superposed with the image previously recorded, the superposed images being displayed on ground glass reticle 144. Alternatively, a projection lamp (not shown) may be positioned to direct light into the camera through ground glass reticle 144 to illuminate the strip of film whereby the previously recorded image is reflected by mirror 120 and directed to lens 118 to appear as a focussed image upon the work table supporting the object to be photographed. In this latter case, the object to be photographed may be viewed superposed with the previously recorded image upon the work table itself. The ability to project the previously recorded image down onto the work table is an extremely helpful feature when the camera is positioned relatively high above the work table, precluding the camera operator from simultaneously manipulating the object to be photographed while viewing the ground glass reticle in order to compose the multiple exposure frame.

Figure 12:
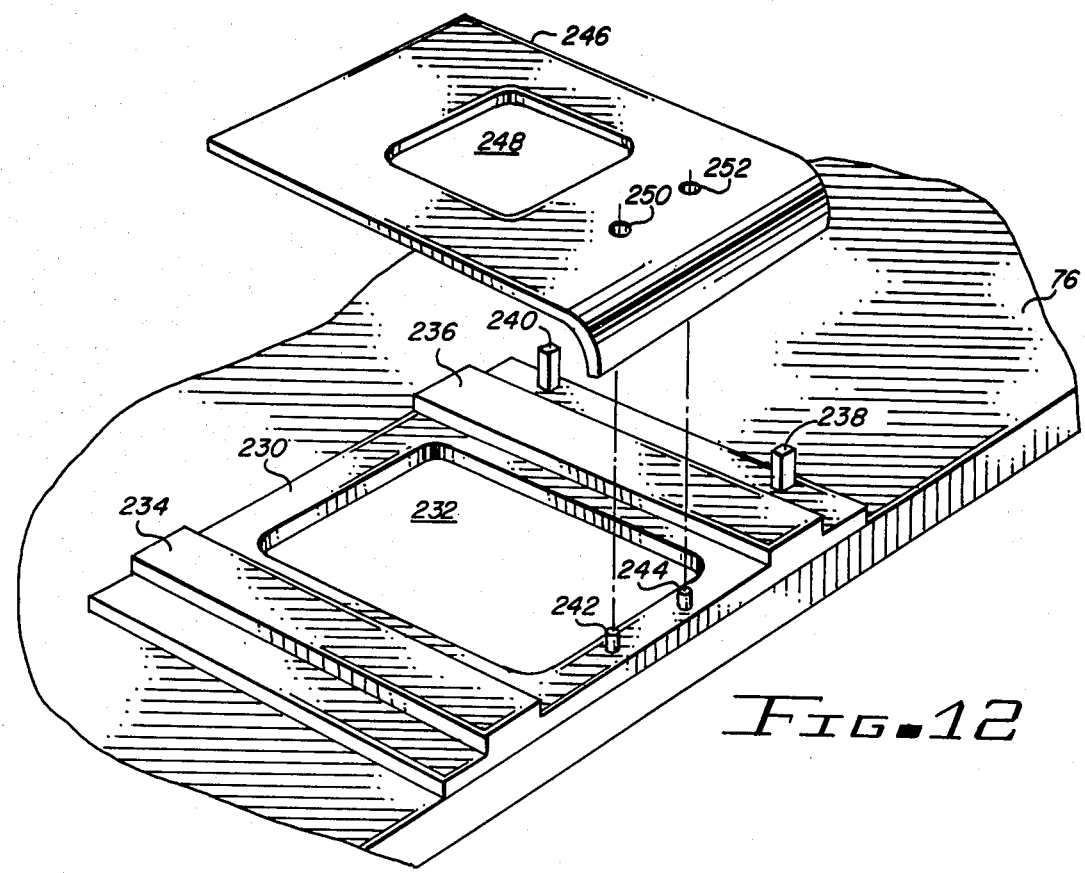
FIG. 12 is a perspective view of an aperture plate assembly including an aperture frame for receiving an aperture mask.

Referring to FIG. 12, aperture plate assembly 76 is shown in greater detail in order to illustrate an aperture mask mechanism. The aperture mask mechanism includes an aperture frame 230 mounted to the upper surface of aperture plate 76. Aperture frame 230 includes an over-sized opening 232 through which light received by lens assembly 118 may pass when aperture 95 or aperture 97 within shutter disk 94 is aligned therewith.

Aperture frame 230 includes two raised portions 234 and 236 on opposite sides of oversized opening 232. During an exposure cycle, the film is urged against the upper surfaces of raised portions 234 and 236 by pressure plate 78. The previously described stripper fingers of pressure plate 78 are spaced laterally apart from raised portions 234 and 236 to avoid interfering with them.

Registration pins 238 and 240 are attached to aperture frame 230 and extend slightly above the upper surfaces of raised portions 234 and 236 in order to engage the sprocket holes along either edge of the film whenever the film is urged against aperture frame 230 by pressure plate 78.

In addition, aperture frame 230 includes two alignment pins 242 and 244 positioned on the upper surface of aperture frame 230 between raised portions 234 and 236 near the front of the camera. Alignment pins 242 and 244 engage alignment holes in aperture masking members as explained below.

Also shown in FIG. 12 is an aperture masking member or mask 246 having an opening 248 smaller than oversized opening 232. Opening 248 may be any size and shape desired by the camera user. The width of mask 246 is slightly smaller than the distance between raised portions 234 and 236 for allowing mask 246 to be slid between raised portions 234 and 236 from the front portion of the camera. Mask 246 has a thickness of approximately 0.015 inches which is the same as the height of raised portions 234 and 236. Thus, film urged against the upper surface of raised portions 234 and 236 will also contact mask 246 when it is inserted into aperture frame 230. To ensure that opening 248 is properly positioned relative to the frame of film, mask 246 is provided with two alignment holes 250 and 252 which fit over alignment pins 242 and 244, respectively.

To illustrate one application of the aperture masking mechanism, it will be assumed that a frame of film will be exposed to first and second images during first and second exposure cycles, respectively, and that the first image will appear on the left side of the frame of film and the second image will appear on the right side of the frame of film. Accordingly, prior to the first exposure cycle, a first mask is selected which has an opening exposing only the left side of the frame of film, and this first mask is inserted into aperture frame 230. Following the first exposure, the first mask is removed and a second complementary mask is selected which has an opening exposing only the right side of the frame of film, and this second mask is inserted into aperture frame 230 prior to the second exposure.

A light seal (not shown) is provided in the front portion of the camera adjacent aperture frame 230 for allowing masks to be slid into aperture frame 230 while preventing light from entering the camera at the point at which the masks are inserted. The light seal consists of a thin slot bordered by a dark resilient cloth-like material such as velvet or felt for sealing any openings between the thin slot and the inserted mask. When a mask is withdrawn from the thin slot, the cloth-like material seals the thin slot against the entry of light.

Figure 13:
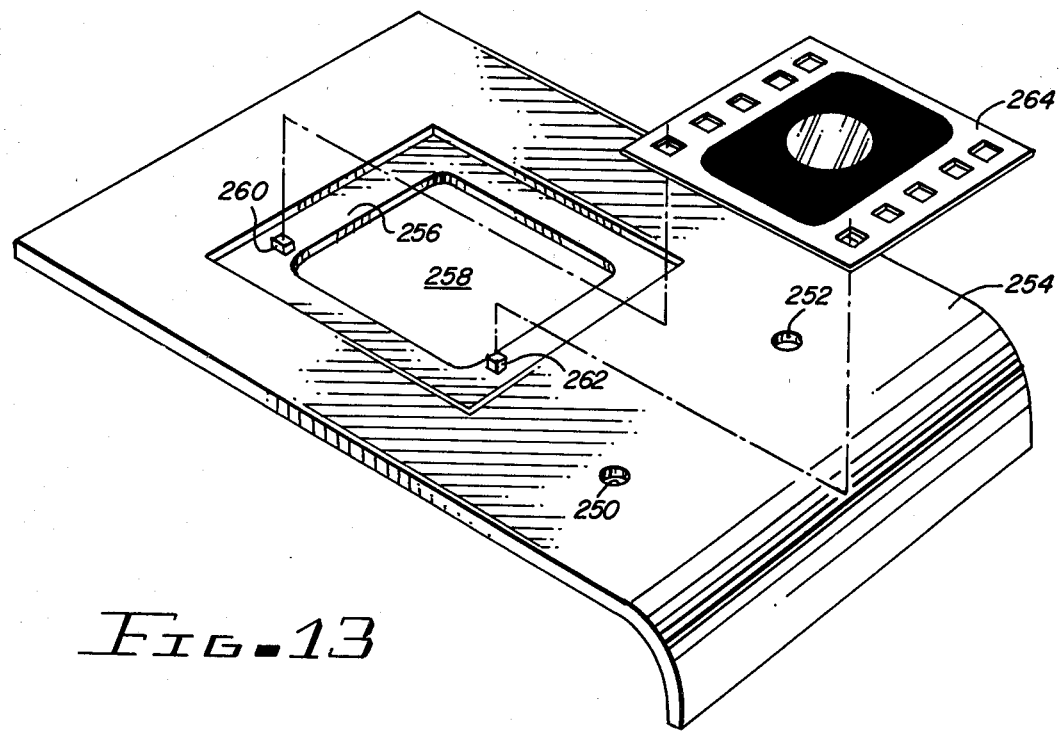
FIG. 13 is a perspective view of a special aperture mask for receiving a film chip.

In FIG. 13, a special aperture masking member or mask 254 differs from mask 246 shown in FIG. 12 in that mask 254 includes a depressed region or pocket 256 approximately 0.007 inches deep in which a generally rectangular opening 258 is formed. Pocket 256 is adapted to support a chip of film above opening 258. Retaining pins 260 and 262 are attached to the upper surface of pocket 256 to engage corresponding holes in the chip of film for retaining the chip of film within pocket 256 when mask 254 is inserted into aperture frame 230.

The chip of film 264 to be inserted within pocket 256 may have any desired pattern of transparent and opaque regions as determined by the user. For example, film chip 264 shown in FIG. 13 includes a centrally-located circular transparent region surrounded by an opaque border. The desired pattern incorporated into the film chip may then be used as a customized mask within pocket 256 for selecting the areas of film to be exposed.

In FIG. 11, a block diagram illustrates the circuitry for controlling the operation of the camera. A microprocessor 162 includes a preprogrammed memory for digitally controlling the operation of the camera. A plurality of input signals are received by microprocessor 162 for selecting the desired mode of operation. A plurality of output signals are generated by microprocessor 162 for controlling such features as film advancement and film exposure. To provide for such applications as slide reproduction wherein a large number of identical exposures are to be taken, the control circuitry provides for an automatic mode of operation in which the camera repetitively exposes the film for a selected number of cycles. The user selects the desired number of cycles by appropriately setting thumb wheels 164. Upon actuating ENTER button 168, microprocessor 162 enters the cycle count selected by thumb wheels 164, and display 166 indicates the selected cycle count. Thereafter, display 166 is decremented by one following each cycle in order to indicate the number of cycles which are yet to be performed.

Frames count display 170 indicates the position of the film relative to a starting position. Actuation of CLEAR button 172 causes display 170 to reset to zero. Thereafter, each advancement of the film in the forward direction increments display 170 by one while each advancement of the film in the reverse direction decrements display 170 by one.

The exposure time for each exposure is selected by appropriately setting thumb wheels 174. Exposure time display 176 initially reflects the exposure time selected by thumb wheels 174. When an exposure cycle begins, display 176 decrements to show the exposure time remaining.

Three-state switch 182 determines whether and in which direction film is to be transported during each cycle. Switch 184 determines whether shutter disk 94 will be rotated during each cycle in order to expose the film.

Three-state format switch 186 selects the film frame format, i.e., the length of film to be advanced during each cycle. Depending upon the position of switch 186, film transport/registration sprocket 62 will rotate either one-eighth, one-quarter, or one-half revolution during each cycle as explained above.

Iris open switch 188 allows the operator to open the iris of lens 118 to its wide-open position while the operator views the image. However, even when switch 188 selects the wide-open position, the iris is automatically stopped down whenever the camera initiates an exposure cycle. NOTCH STEP button 189 may be used in the manual mode of operation to actuate a film notcher (not shown) for referencing a location of the film.

Switch 178 is used to select between manual, automatic, and programmed modes of operation. In the manual mode of operation, each cycle must be initiated by the operator. In the automatic mode of operation, a plurality of consecutive cycles will be performed by the camera as determined by the selected cycle count. In the programmed mode of operation, the control circuitry will execute up to fifty user-programmed automatic cycles, each of the fifty automatic cycles including up to 9,999 separate exposures. Start button 180 initiates either a single cycle, a plurality of identical cycles, or a series of user-programmed cycles, as determined by the position of switch 178.

In order to control stepper motor 86 which drives film transport/registration sprocket 62, microprocessor 162 supplies a pulsed signal to bi-level driver module 192 for controlling the field coils within stepper motor 186. Bi-level driver module 192 may be of the type supplied by Anaheim Automation Corporation under Model No. M-62. As stepper motor 86 is rotated, light sensor 92 acts as a shaft encoder for indicating to microprocessor 162 the next transparent portion of glass disk 88, i.e., the next home position of the shaft of stepper motor 86 and thereby verifying that stepper motor 86 has been properly indexed.

Similarly, in order to control stepper motor 108 for rotating shutter disk 94, microprocessor 162 supplies a pulsed signal to bi-level driver module 200 which controls the voltage across the field coils within stepper motor 108. Bi-level driver module 200 may also be of the type supplied by Anaheim Automation Corporation under Model No. M-62. As stepper motor 108 rotates shutter disk 94, light sensor 116 indicates to microprocessor 162 that shutter disk 94 has been properly rotated.

Microprocessor 162 also supplies a signal to driver circuit 206 for controlling the movable reflex mirror assembly solenoid 140. Similarly, microprocessor 162 supplies a signal to driver circuit 210 for controlling iris solenoid 212 for opening the iris of lens 118.

Microprocessor 162 also supplies signals for controlling the D.C. motors incorporated into the film supply magazine and film take-up magazine. Driver circuits 214 and 216 each receive a signal from microprocessor 162. In response to the signals received from microprocessor 162, driver circuit 214 actuates motor 22 within film supply magazine 8, while driver circuit 216 actuates a similar D.C. motor 222 within film take-up magazine 10.

When film is transported in the forward direction, magnetic sensor 44 within film supply magazine 8 indicates to microprocessor 162 when to unwind film from the film supply reel. However, when film is transported in the forward direction, motor 222 within the film take-up magazine is actuated whenever stepper motor 86 is actuated. Thus, when film is transported in the forward direction, take-up motor 222 acts as a torque motor for keeping tension on the film.

A similar magnetic sensor 224 within film take-up magazine 10 indicates to microprocessor 162 when to unwind film from the film take-up reel when film is being transported in the reverse direction. When film is transported in the reverse direction, microprocessor 162 is responsive to magnetic sensor 224 for controlling motor 222. Similarly, during film transport in the reverse direction, D.C. motor 22 is actuated whenever stepper motor 86 is actuated, D.C. motor 22 thereby functioning as a torque motor.

While the invention has been described with reference to a preferred embodiment thereof, the description is for illustrative purposes only and is not to be construed as limiting the scope of the invention. For example, film transport sprocket 62 might be replaced by a rubber capstan drive in order to transport films lacking sprocket holes, such as microfilm. Various modifications and changes may be made by those skilled in the art without departing from the true spirit and scope of the invention as defined by the appended claims.

We claim:
1. A camera for taking a plurality of exposures upon a continuous length of film, the film having sprocket holes along at least one edge thereof, said camera comprising in combination:
(a) a sprocket for engaging the sprocket holes in the film, said sprocket causing the film to be transported through said camera when said sprocket is rotated;
(b) exposure means for selectively exposing a portion of film for a variable length of time, said exposure means including an aperture plate having an aperture therein for exposing a portion of film adjacent the aperture, said aperture plate including registration pins for engaging the sprocket holes in the film;
(c) guide means for guiding the film transported through said camera past the aperture of said exposure means;
(d) a movable pressure plate positioned on a side of the film opposite said aperture plate for urging the film against said registration pins during each exposure of the film;
(e) a stepping motor having a shaft coupled to said sprocket for rotating said sprocket by a predetermined incremental angle between exposures while maintaining the portion of film adjacent said aperture plate stationary during an exposure, said sprocket simultaneously engaging sprocket holes within first and second portions of the film lying on opposite sides of said aperture plate, the film extending between said sprocket and said aperture plate being maintained as a tight loop for allowing said sprocket to position the film relative to said aperture plate;

(f) transport control means coupled to said stepping motor for selectively actuating said stepping motor; and
(g) film supply means for supplying film from a film supply reel to said camera for exposure thereby, and film take-up means for receiving film exposed by said camera, said film supply means isolating the inertia of the film supply reel from said sprocket and including:
  (i) drive means for supporting the film supply reel containing the film to be exposed by said camera and for rotating the film supply reel to unwind film contained thereby;
  (ii) a movable roller engaging the film unwound from the film supply reel, said movable roller being displaced by the film as the film is withdrawn from said film supply means;
  (iii) a ferrous metal member attached to said movable roller for movement therewith; and
  (iv) a magnetic sensor for sensing the position of said ferrous metal member and actuating said drive means in accordance therewith.

* * * * *